United States Patent [19]

Sogoian

[11] 4,180,230
[45] Dec. 25, 1979

[54] HANGER FOR VEHICLE MUD FLAPS

[76] Inventor: Nash P. Sogoian, 1417 21st St., Detroit, Mich. 48216

[21] Appl. No.: 885,362

[22] Filed: Mar. 13, 1978

[51] Int. Cl.² ............................................ F16M 13/00
[52] U.S. Cl. ............................. 248/573; 280/154.5 R
[58] Field of Search ................. 280/154.5 R; 248/573, 248/145

[56] References Cited

U.S. PATENT DOCUMENTS

| | | | |
|---|---|---|---|
| 2,652,266 | 9/1953 | Miller | 280/154.5 R |
| 2,660,453 | 11/1953 | Russell et al. | 280/154.5 R |
| 2,935,336 | 5/1960 | Case | 280/154.5 R |
| 3,219,363 | 11/1965 | Dalsey et al. | 280/154.5 R |
| 3,333,868 | 8/1967 | Sogoian | 280/154.5 R |
| 3,848,842 | 11/1974 | Jepsen | 280/154.5 R X |
| 3,999,776 | 12/1976 | Betts, Sr. | 280/154.5 R |
| 4,113,216 | 9/1978 | Fuse et al. | 248/573 |

Primary Examiner—Joseph F. Peters, Jr.
Assistant Examiner—Norman L. Stack, Jr.
Attorney, Agent, or Firm—Gifford, Chandler, VanOphem, Sheridan & Sprinkle

[57] ABSTRACT

An improved hanger for vehicular mud flaps is provided comprising a first and second elongated support member. One end of the first support member is secured to the vehicle while the second support member is telescopically mounted to the free end of the first support member. A spring resiliently urges the second support member axially outward from the first support member while permitting retraction of the second support member relative to the first support member when required to prevent a breakage or bending of the mud flap hanger. A coiled spring on the end of the hanger permits the end flap to be twisted without damaging the hanger.

12 Claims, 3 Drawing Figures

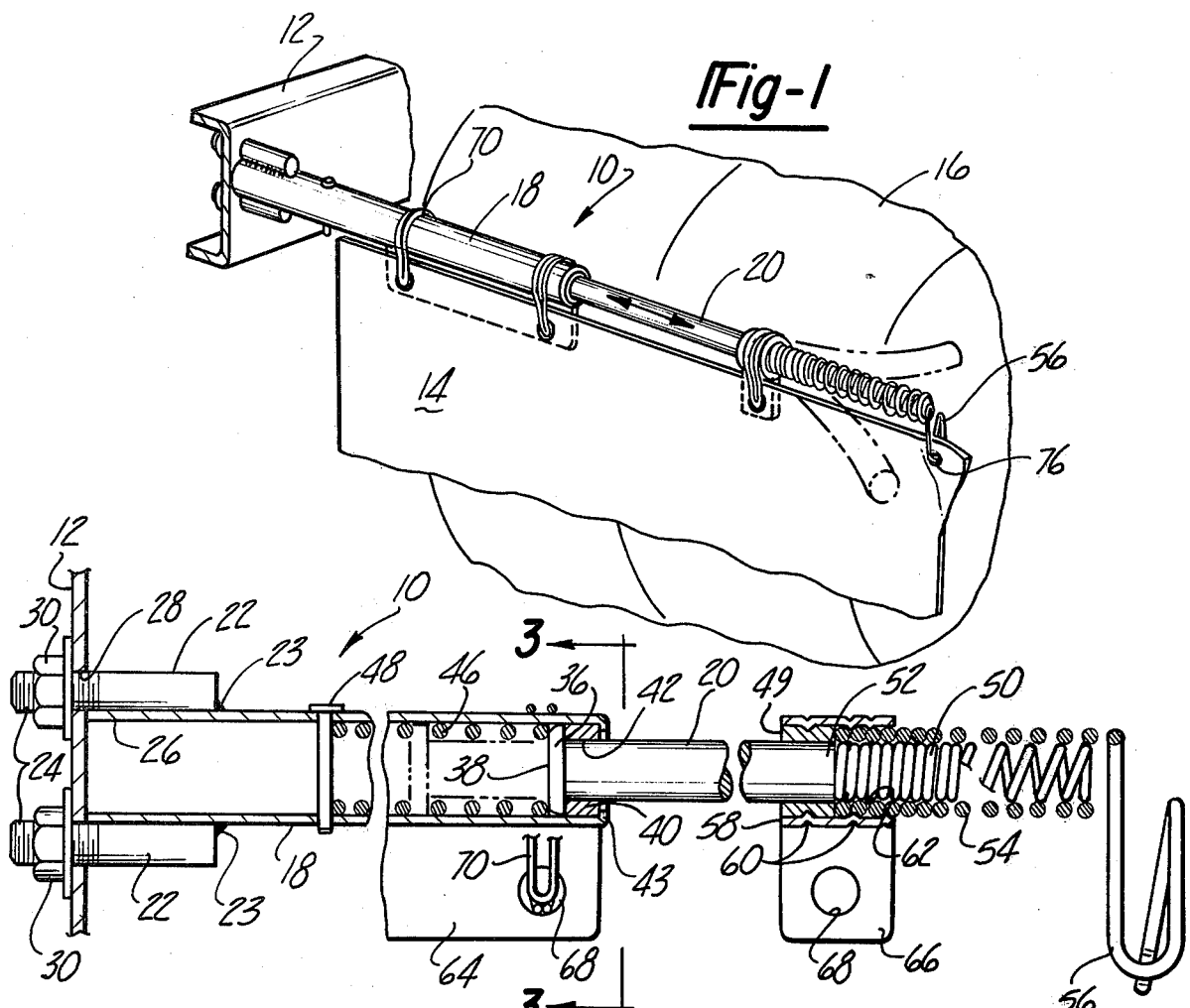
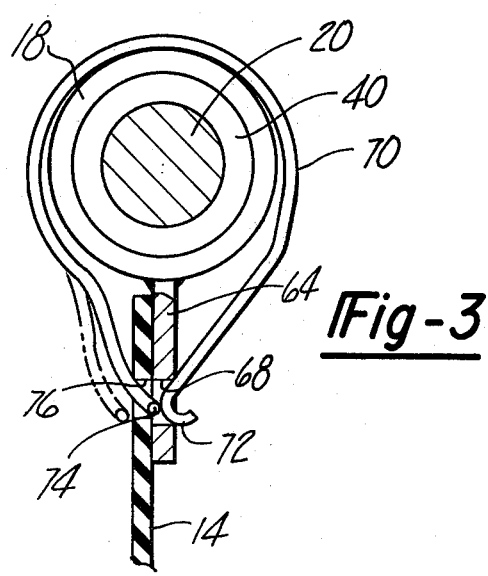

HANGER FOR VEHICLE MUD FLAPS

BACKGROUND OF THE INVENTION

I. Field of the Invention

The present invention relates to an improved hanger for vehicular mud flaps and, more particularly, to such a device having means for permitting axial retraction as well as axial deflection of the mud flap support member, without damage to the hanger.

II. Description of the Prior Art

In many localities it is required by law that trucks, trailers and similar vehicles be provided with mud flaps to prevent damage to other vehicles from rocks and debris thrown by the wheels. The hangers for such mud flaps, which are expensive to manufacture, are oftentimes damaged by minor collisions with various obstructions.

In order to protect the mud flap hanger during such minor collisions, there are previously known mud flap hangers with means to permit the deflection of the hanger from its normal position. Examples of such mud flap hangers are disclosed in my previous U.S. Pat. No. 3,224,719, issued Dec. 21, 1965, and U.S. Pat. No. 3,940,165, issued Feb. 24, 1976.

One disadvantage of these previously known mud flap hangers is that these hangers only permit lateral or angular position of the hanger from its normal position. Consequently, when an axial load or force is imposed upon these previously known hangers, these hangers are damaged and oftentimes require expensive replacement.

A still further disadvantage of these previously known vehicular mud flap hangers is that replacement of the mud flap itself not only was difficult and time consuming, but also oftentimes resulted in damage to the mud flaps.

SUMMARY OF THE PRESENT INVENTION

The present invention overcomes the above-mentioned disadvantages of the previously known vehicular mud flap hangers by providing such a hanger capable of axial retraction as well as axial deflection. In addition, improved means for securing the mud flap to the hanger are provided which enables rapid attachment and detachment of the mud flap to and from the hanger and without damage to the mud flap itself.

In brief, the hanger according to the present invention comprises a first elongated support member and a second elongated support member. One end of the first support member is rigidly secured to a vehicle framing member by a double bolt arrangement while the second support member is telescopically carried by the free end of the first support member. Resilient means urge the second support member axially outwardly from the first member while permitting axial retraction of the second support member relative to the first member when required by a minor collision or the like.

Preferably, a pair of oppositely wound helical springs are secured to and extend axially outwardly from the free end of the second support member the springs being closely wound with one spring disposed within the other. The helical springs by reason of being closely and oppositely wound are self-supporting but yet they permit lateral or angular deflection of the hanger upon collision with minor obstacles.

The improved means for securing the mud flap onto the hanger of the present invention comprises a plurality of resilient and generally C-shaped clips having their free ends in abutment with each other. Each clip is disposed around one of the support members so that the free end of the clips register with holes formed in a mounting flange or flanges extending downwardly from the support members. The mud flaps conventionally include mounting holes which register with the mounting holes formed in the support flanges whereby the free ends of the clip extend through the registering holes in the mud flap and hanger mounting flange to thereby securely, but detachably, mount the mud flap to the mud flap hanger.

BRIEF DESCRIPTION OF THE DRAWINGS

A better understanding of the present invention will be had upon reference to the following detailed description when read in conjunction with the accompanying drawing, wherein like reference characters refer to like parts throughout the several views, and in wnich:

FIG. 1 is a perspective view of the vehicular mud flap hanger according to the present invention mounted onto a vehicle;

FIG. 2 is a fragmentary, longitudinal cross-sectional view of the mud flap hanger of the present invention; and FIG. 3 is a cross-sectional view of the mud flap hanger of the present invention taken substantially along line 3—3 in FIG. 2.

DETAILED DESCRIPTION OF THE PRESENT INVENTION

With reference first to FIG. 1, a mud flap hanger 10 according to the present invention is thereshown secured to a framing member 12 of a vehicle such as a truck or the like. The mud flap hanger 10 is adapted to carry a mud flap 14 in a position behind wheels 16 of the vehicle and extending downwardly from the hanger 10. The actual attachment between the hanger 10 and the mud flap 14 will be subsequently described in greater detail.

With reference now to both FIGS. 1 and 2, the hanger 10 generally comprises an elongated tubular first support member 18 and a second elongated cylindrical support member 20. A pair of studs or bolts 22 are attached by welds 23 or the like to the outer surface at one end 26 of the first support member 18 so that the studs 22 are substantially parallel to the longitudinal axis of the first support member 18 and diametrically opposed to each other. A threaded portion 24 on each of the studs 22 extends beyond the end 26 of the first support member 18 and through receiving apertures 28 formed in the framing member 12 of the vehicle. Appropriate nuts 30 threadably engage the threaded portion 24 of the studs 22 to thereby secure the first framing member 18 generally perpendicularly to the vehicle framing member 12. This means for attaching the hanger 10 to the vehicle is simple, inexpensive and yet totally effective in operation. Previously, mud flap hangers have been secured to the vehicle by a more expensive, spring loaded bolt arrangement.

An enlarged diameter piston 36 is formed at one axial end 38 of the second support member 20. The piston 36 is of substantially the same diameter as the inside diameter of the tubular first support member 18 so that the piston 36 is slidably or telescopically received within the free end of the first support member 18. An annulus 40 having a bore 42 through which the second support member 20 extends is secured within the interior of the first member 18 at its free end. The annulus 40 acts as a stop to maintain the piston 36 within the interior of the first support member 18. Preferably, a portion of the support member 18 is bent over the annulus 40 as shown at 43 to retain the annulus 40 in position.

A helical spring 46 is disposed within the interior of the first support member 18 between the piston 36 and a stop member 48, such as a pin, secured to the first support member 18. The spring 46 is in a state of compression and, therefore, urges the second support member 20 toward a telescopically extended position with respect to the first support member 18. However, the spring 46 permits the second support member 20 to telescopically retract within the interior of the first support member 18.

A helical spring 50 is secured to the other end 52 of the second support member 20 so that the spring 50 extends axially outwardly from the end 52 of the second support member 20. A second helical spring 54 is disposed coaxially around the spring 50 and includes a loop 56 formed at its outermost or free end. Preferably, the springs 50 and 54 are oppositely and closely wound, for example the spring 50 is right wound while the spring 54 is left wound, so that the inner spring 50 rests within the outer spring 54. The oppositely wound springs 50 and 54 are self-supporting so that they retain their axial position while still being capable of being deflected 180° in all directions.

Any appropriate means can be employed to secure the springs 50 and 54 both to each other and to the second support memer 20. However, preferably, a tube 58 extends coaxially around both an annulus 49 secured at the free end of the second support member 20 and a portion of the outer helical spring 54. The tubular member 58 is indented as shown at 60 in order to secure it both to the spring 54 and to the annulus 49 while the springs 50 and 54 are preferably secured together by welds 62.

A longitudinally extending flange 64 is carried on the outer surface of the first support member 18 while a second and shorter flange 66 is carried along the outer surface of the tubular member 50. Both flanges 64 and 62 include at least one hole 68 formed therethrough to provide the means by which the mud flap 14 is attached to the hanger 10.

With references now to FIGS. 1-3, although conventional means, such as nuts and bolts, can be used to secure the mud flap 14 to the hanger 10, preferably a plurality of spaced clips 70 are employed thereinstead. Each clip 70 is substantially C-shaped but with its free ends 72 and 74 compressed into contact with each other. Each clip 70 is constructed of a strong, but resilient, material, such as steel, and is positioned around the first support member 18 or tubular member 58 so that its free ends 72 and 74 are in registration with the hole 68 formed in the flange 64 or 66. In order to secure the mud flap 14 to the hanger 10, the free ends 72 and 74 of the clip 70 are first spread apart, as shown in phantom line in FIG. 3, so that the top of the mud flap 14 can be slid along the flange 64 or 66 until the receiving hole 76 for the mud flap 14 is in registration with the flange hole 68. Thereafter, the free ends 72 and 74 of the clip 70 are released so that the free ends 72 and 74 again come in contact with each other through the registering holes 76 and 68 to detachably mount the mud flap 14 to the hanger flanges 64 and 66.

In addition, as best shown in FIG. 1, the loop 56 at the free end of the spring 54 extends through the outermost receiving aperture 76 in the mud flap to attach the outer end of the mud flap 14 to the hanger 10.

With reference now to FIG. 1, in operation the mud flap 14 is first attached to the haner 10 by the clips 70 and the spring loop 56 in the previously described fashion. The springs 54 and 50 at the free end of the second support member 20 permit angular or lateral deflection, as shown in phantom line, in order to prevent damage to the hanger 10 upon the unintended collision of the outermost end of the hanger 10 with an obstacle.

During normal operation, the helical spring 46 within the interior of the first support member 18 maintains the second support member 20 in the telescopically extended position shown in FIG. 1. However, when an axial force or load is imposed upon the second support member 20, either directly or through the springs 50 and 54, the second support member 20 telescopically retracts into the interior of the first support member 18 thus compressing the spring 46. In this fashion, damage to the hanger 10 is avoided. Moreover, the second support member 20 returns to its telescopically extended position when the axial force is removed for continued operation.

It can, therefore, be seen that the hanger 10 of the present invention provides a substantial improvement in the art of vehicular mud flap hangers by providing a mud flap hanger which is protected from damage from both lateral and axial forces. Moreover, the hanger 10 of the present invention is relatively inexpensive in construction and enjoys long and maintenance free operation.

It should also be apparent to those skilled in the art to which it pertains that the clips 70 provide a simple and yet efficient means for securing the mud flap 14 to the hanger 10. In addition, attachment of the mud flap 14 to the hanger 10 and vice versa can be rapidly accomplished and without damage to the mud flap 14.

Having described my invention, however, many modifications thereto will become apparent to those skilled in the art to which it pertains without deviation from the spirit of the invention as defined by the scope of the appended claims.

I claim:

1. A hanger for a vehicular mud flap comprising:
   an elongated first support member,
   means carried at one end of said first support member for mounting said first support member to a vehicle,
   a second elongated support member,
   means for telescopically mounting said second support member relative to said first support member,
   resilient means for urging said second support member toward a telescopically extended position with respect to said first support member,
   a lateral deflection means secured to and extending outwardly from the free end of said second support member said lateral deflection means comprising at least one resilient member adapted to be deflected laterally in a manner to urge said second support member toward a telescopically retracted position, and
   means for securing a mud flap onto said support members so that said mud flap hangs downwardly from said support members.

2. The invention as defined in claim 1 wherein said lateral deflection means comprises at least one helical spring.

3. The invention as defined in claim 2 and including a loop formed at the free end of the helical spring wherein said loop is adapted to engage a hole in the mud flap to thereby support said mud flap.

4. The invention as defined in claim 1 wherein said first support member is tubular and said second support member is telescopically mounted within the interior of the first support member, and wherein said telescopic mounting means further comprises stop means for limiting the telescopically extended position of said second support member with respect to the first support member.

5. The invention as defined in claim 4 wherein said resilient means comprises a helical spring positioned within the interior of the first support member and between the end of the second support member and a stop member secured to the first support member.

6. The invention as defined in claim 1 wherein said securing means comprises at least one longitudinally extending flange exteriorly secured to at least one of the support members, said flange having at least one hole formed therethrough which is adapted to register with a mounting hole in a mud flap, and a C-shaped mounting clip constructed of a resilient material and having its free ends in contact with each other, said clip being disposed around one of said support members so that the abutting ends of the clip register with the registering holes in the mud flap and mounting flange to detachably secure the mud flap to the mounting flange.

7. The invention as defined in claim 1 wherein said means carried at one end of said remainder of said support member for mounting said first support member to a vehicle comprises a pair of studs secured to the outer periphery of said support member so that the ends of the studs extend axially outwardly from said support member, the free ends of said studs being adapted for insertion through registering holes formed in a framing member for a vehicle, and nut members for threadably engaging said studs.

8. The invention as defined in claim 7 wherein said studs are secured to said support member at substantially diametrically opposed positions.

9. The invention as defined in claim 7 wherein said studs are welded to said support member.

10. The invention as defined in claim 1 wherein said lateral deflection means include means for securing a mud flap thereto.

11. A hanger for a vehicular mud flap comprising:
an elongated first support member,
means carried at one end of said first support member for mounting said first support member to a vehicle,
a second elongated support member,
means for telescopically mounting said second support member relative to said first support member,
resilient means for urging said second support member toward a telescopically extended position with respect to said first support member,
lateral deflection means comprising a pair of coaxial helical springs with one helical spring disposed within the interior of the other spring, said lateral deflection means being resilient and adapted to be deflected laterally in a manner to urge said second support member toward a telescopically retracted position, and
means for securing a mud flap onto said support members so that said mud flap hangs downwardly from said support members.

12. The invention as defined in claim 11 wherein said springs are oppositely wound.

* * * * *